(12) United States Patent
Martin

(10) Patent No.: US 9,402,774 B1
(45) Date of Patent: Aug. 2, 2016

(54) IV POLE AND STROLLER COMBINATION

(71) Applicant: Barbara Martin, Council Bluffs, IA (US)

(72) Inventor: Barbara Martin, Council Bluffs, IA (US)

( * ) Notice: Subject to any disclaimer, the term of this patent is extended or adjusted under 35 U.S.C. 154(b) by 0 days.

(21) Appl. No.: 14/622,905

(22) Filed: Feb. 15, 2015

Related U.S. Application Data

(63) Continuation-in-part of application No. 13/740,702, filed on Jan. 14, 2013, now abandoned.

(60) Provisional application No. 61/585,780, filed on Jan. 12, 2012.

(51) Int. Cl.
*A61G 5/10* (2006.01)
*B62B 9/00* (2006.01)
*A61G 12/00* (2006.01)
*A61G 5/08* (2006.01)

(52) U.S. Cl.
CPC ................ *A61G 12/001* (2013.01); *A61G 5/08* (2013.01); *A61G 5/10* (2013.01); *A61G 2005/0833* (2013.01); *A61G 2005/1091* (2013.01)

(58) Field of Classification Search
CPC .............. B62B 7/00; B62B 9/00; B62B 9/12; B62B 9/14; B62B 9/147; A61G 5/10; A61G 2005/1094; A61G 12/001; A61G 5/08
USPC ........ 280/642, 647, 650, 47.38, 288.4, 304.1, 280/33.992
See application file for complete search history.

(56) References Cited

U.S. PATENT DOCUMENTS

| | | | | |
|---|---|---|---|---|
| 882,902 A * | 3/1908 | Loshbough | .................... | 280/642 |
| 3,561,787 A * | 2/1971 | Toda et al. | .................... | 280/642 |
| 4,511,157 A * | 4/1985 | Wilt, Jr. | .................... | 280/304.1 |
| 5,054,732 A * | 10/1991 | Sukup | .................... | 248/309.1 |
| 5,219,139 A * | 6/1993 | Hertzler et al. | .................... | 248/276.1 |
| 5,374,074 A * | 12/1994 | Smith | .................... | 280/304.1 |
| 5,641,197 A * | 6/1997 | Springmann | .................... | 297/188.11 |
| D403,621 S * | 1/1999 | Spinella | .................... | D12/128 |
| 6,155,592 A * | 12/2000 | Hsia | .................... | 280/647 |
| 7,017,922 B2 * | 3/2006 | Hartenstine et al. | .................... | 280/47.38 |
| 9,033,349 B2 * | 5/2015 | Graves et al. | .................... | 280/47.35 |
| 2009/0008899 A1 * | 1/2009 | Blankenship et al. | .................... | 280/288.4 |

* cited by examiner

*Primary Examiner* — Frank Vanaman
(74) *Attorney, Agent, or Firm* — The Gray Law Group, Ltd; Robert Gray

(57) ABSTRACT

An IV pole and stroller combination provides a wheel base, which, in the first and second exemplary embodiments, replaces the stroller's rear wheels. The stroller's front portion is equipped with one or more steerable front wheels, and the stroller folds up for compact storage. The IV pole is equipped with typical IV pole features, such as hooks for fluid bags and mounts for other medical equipment. The stroller portion is equipped with typical stroller features, such as a storage basket underneath the child's seat, a sun shade, and a bottle holder. In an alternative exemplary embodiment, the wheel base and number of wheels are reduced; the vertical IV pole member may not be directly affixed to the wheel base, and may instead be removably affixed to a portion of the stroller frame.

18 Claims, 4 Drawing Sheets

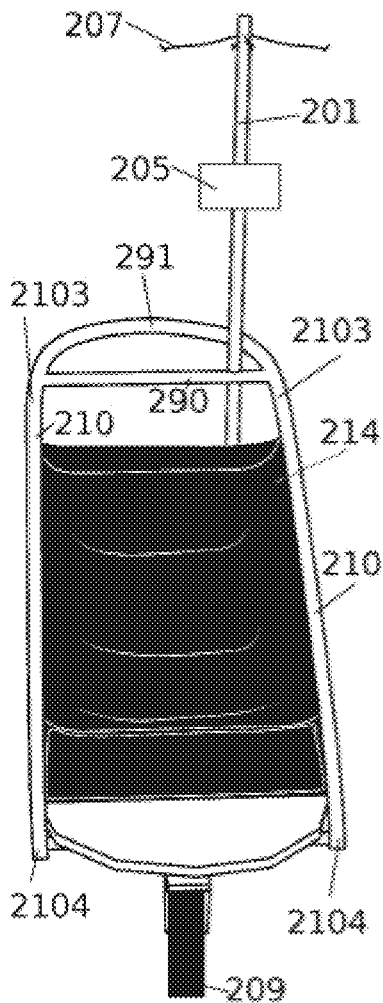
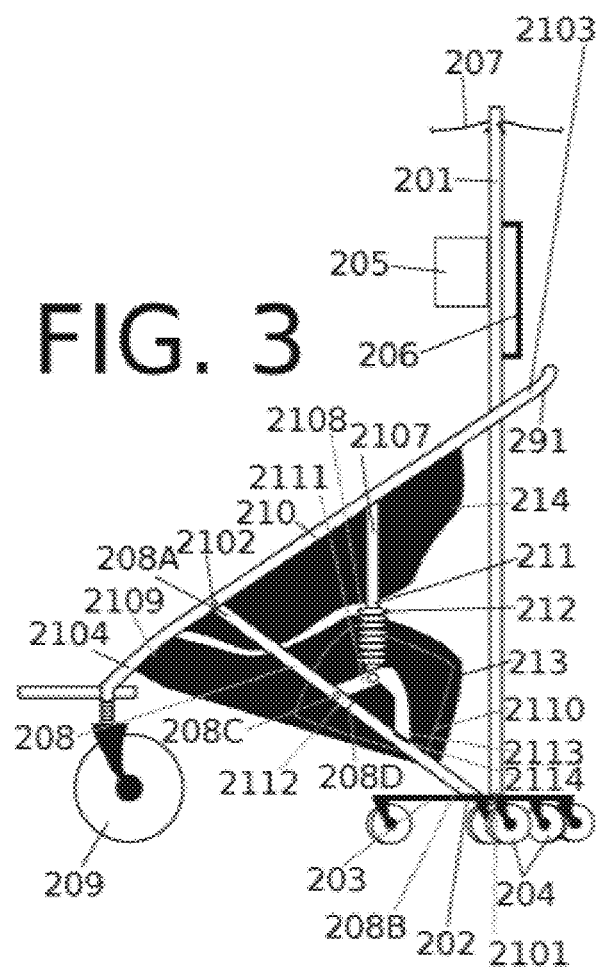
FIG. 2
FIG. 3

IV POLE AND STROLLER COMBINATION

CROSS-REFERENCE TO RELATED APPLICATIONS

This application is a continuation-in-part of copending U.S. patent application Ser. No. 13/740,702, filed on Jan. 14, 2013, and which claims the benefit of U.S. Provisional Application No. 61/585,780, filed on Jan. 12, 2012, both of which are hereby incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to pediatric medical equipment, and specifically to devices that combine the features of a stroller with those of an IV pole. The administration of medicine to patients by intravenous ("IV") drip is well known in the prior art, as is the use of strollers for transporting children and babies. A challenge often faced by parents and caregivers of patients who are small children is that the need to be connected to IV fluids and other equipment makes it very difficult to move the child patient around for entertainment and mental and emotional well-being. Conventional IV poles are generally equipped with wheels and battery-powered electronics, and thus may be made mobile, however such conventional devices are often not suitable for patients who are too young to walk, or are too young to walk in a controlled manner. Similarly, while it is possible to place a child patient in a conventional stroller for mobility, and then have the caretaker push both the stroller and the IV pole, this is usually awkward for the caregiver and prone to accidents. Accordingly, a useful device would combine the benefits of an IV pole with those of a stroller.

SUMMARY OF THE INVENTION

Accordingly, the invention is directed to an IV pole and stroller combination. In the first and second exemplary embodiments, the IV pole's wheel base replaces the stroller's rear wheels. The stroller's front portion is equipped with one or more steerable front wheels, and the stroller folds up for compact storage. The IV pole is equipped with typical IV pole features, such as hooks for fluid bags and mounts for other medical equipment. The stroller portion is equipped with typical stroller features, such as a storage basket underneath the child's seat, a sun shade, and a bottle holder. In an alternative exemplary embodiment, the wheel base and number of wheels are reduced; the vertical IV pole member may not be directly affixed to the wheel base, and may instead be removably affixed to a portion of the stroller frame.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 2 shows a front view of the second exemplary embodiment, displaying the first vertical support member, supports for medical devices, hooks, front wheels, upper angled support members, seat, cross member, and handlebar, and additionally identifying geometric positions.

FIG. 3 shows a side profile view of the second exemplary embodiment, displaying the first vertical support member, the wheel base, radial members, the wheels, supports for medical devices, secondary vertical member, hooks, lower angled support members, front wheels, upper angled support members, secondary vertical supports, tension mechanism, storage basket, seat, the c-shaped members, and additionally identifying geometric positions.

DETAILED DESCRIPTION OF THE INVENTION

Figure 1:
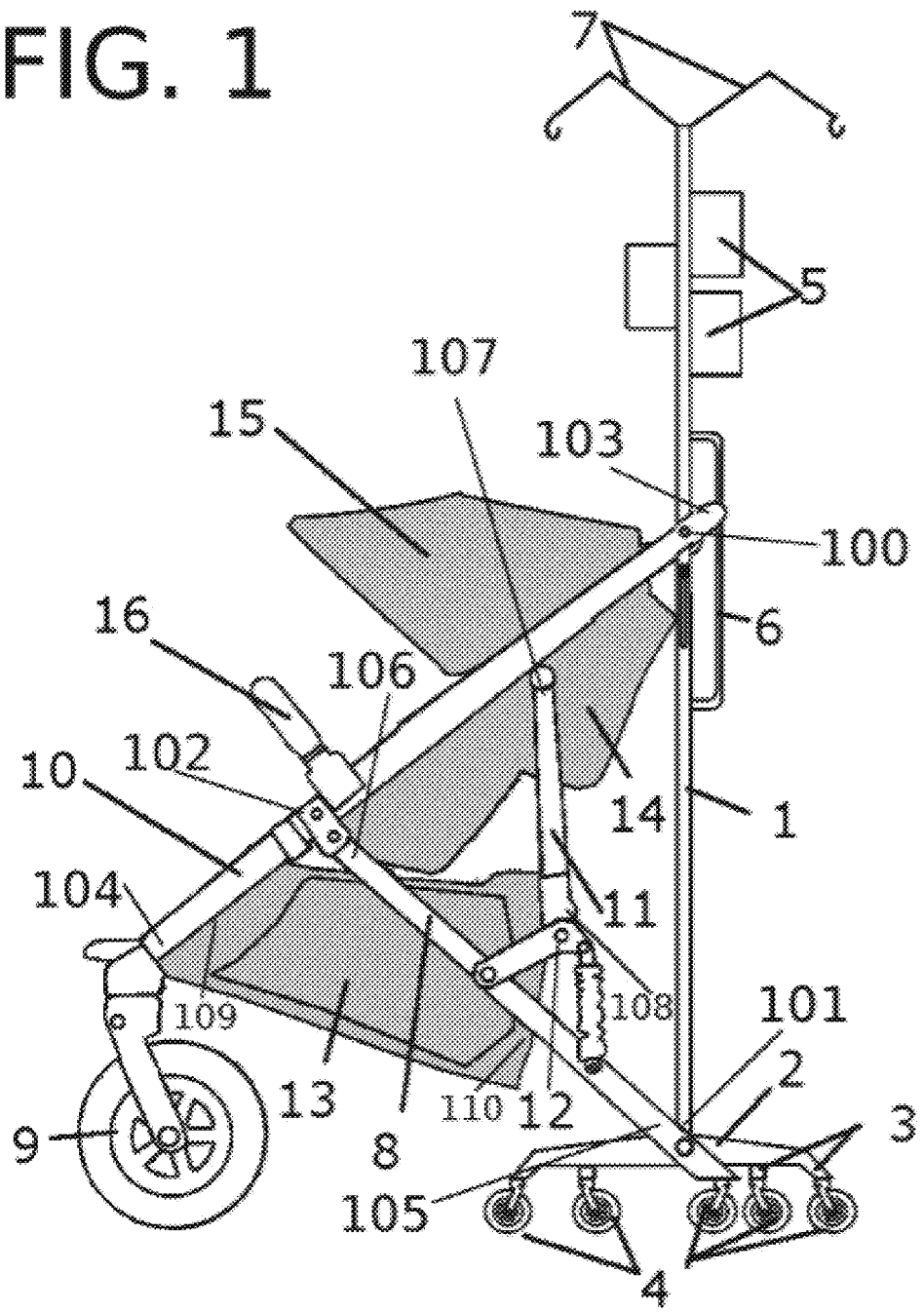
FIG. 1 shows a side view of the first exemplary embodiment of the invention, displaying the first vertical support member, the wheel base, radial members, the wheels, supports for medical devices, secondary vertical members, hooks, lower angled support members, front wheels, upper angled support members, secondary vertical supports, tension mechanism, storage basket, seat, sun shade, and ring support, and additionally identifying geometric positions.

Referring now to the invention in more detail, FIG. 1 shows a first exemplary embodiment of the invention. The core of the apparatus comprises a first vertical support member 1, to which is attached the structural elements of a stroller more fully described below. The first vertical support member 1 is envisioned as being cylindrical in shape and made of a rigid metallic material however other shapes and materials may be employed.

Referring still to the apparatus of FIG. 1, fixedly attached to the first vertical support member 1 are various features customarily installed on IV poles. One such feature is a secondary vertical member 6, which is attached to the first vertical support member 1 by a pair of short horizontal supports; the secondary vertical member may be used as a handle or as a support for medical devices. Another such feature is a plurality of supports for medical devices 5; such supports are of the type commonly found in IV poles and/or existing medical devices designed to be mounted on IV poles. Another such feature is a plurality of hooks 7 for the attachment of IV fluid bags. The apparatus may have any combination of features on the first vertical support member 1 with the general intention that the first vertical support member 1 may support any medical equipment that must be transported with a child patient using the apparatus.

Referring still to the apparatus of FIG. 1, the base of the first vertical support member 1 is mounted to a wheel base 2, which features a plurality of radial members 3, each of which has an attached wheel 4 at the end. The wheels 4 and wheel base 2 may be of any size, number, or configuration needed to stably support the apparatus. Attached pivotally to the lower end 105 of the vertical support 1, or to the wheel base 2 as shown, may be the first end 105 of one of a pair of lower angled support members 8; alternatively, the first ends 105 of the pair of lower angled support members 8 may be linked by a cross member, which in turn may be affixed to the lower end 105 of the vertical support 1. The second end 106 of each of the lower angled support members 8 is pivotally attached to each of a pair of upper angled support members 10 at a position distal to the longitudinal center 102. The first end 103 of one of the upper angled support members 10 may be rotatably affixed to the vertical support 1 at a point near or about the longitudinal center 100 thereof in the direction of its second end 104, as shown; alternatively a cross member or handlebar may link the first ends 103 of the upper angled support members 10, and the vertical support member 1 may be rotatably affixed thereto. The lower angled support members 8 may be capable of flexing or pivoting by a central hinge or other means, specifically where the tension mechanism 12 (introduced below) is affixed, as shown. Also pivotally attached to each of the upper support members 10 is the first end 107 of each of a pair of secondary vertical supports 11. The second end 108 of each of the secondary vertical supports 11 is pivotally attached to a tension mechanism 12, which in turn pivotally attaches at two points to each of the lower angled support members 8, as shown; the position of the tension mechanism 12 is the intended location of the flexing pivoting of the lower angled support members 8 (described above). The lower angled support members 8, secondary vertical support 11 and tension mechanism 12 may all include additional hinges as needed to allow the apparatus to fold properly and, may be collectively substituted for an alternative folding and tension mechanism, many such mechanisms being known in the prior art.

The above described support components 8, 10, 11, and 12 are presently envisioned as being cylindrically shaped metal or plastic material, however other suitable shapes and materials maybe employed. The action of the same components is generally to allow the apparatus to collapse for storage by allowing the lower angled support members 8 to pivot such that its axial center moves in a clockwise direction as viewed in FIG. 1 (such action is permitted by the central flexing or pivoting of a central hinge, as described above), upward and toward the vertical member 1, and allowing the upper angled members 10 to pivot in an anticlockwise direction as viewed in FIG. 1, downward and toward the vertical support 1. The foregoing is but one example of a suitable collapsing mechanism for the apparatus; many are known in the prior art and may be employed in the invention. Those skilled in the art of stroller design will be able to construct a suitable collapsing stroller support mechanism without undue experimentation.

Referring still to the apparatus of FIG. 1, the second ends 104 of the upper angled support members 10 may be affixed to each other by one or more cross members, or may be angled inward with respect to the axial line of the apparatus so as to meet at a point. The cross member(s) or meeting point becomes an attachment point for one or more steerable front wheels 9. The wheels may employ a caster design to swivel and thereby effect the steering of the apparatus. Many suitable caster and wheel designs and materials are known in the prior art, and any may be employed in the invention.

Referring still to the apparatus of FIG. 1, the stroller portion of the invention bears a number of features commonly found on child strollers. Specifically, a fabric or flexible material seat 14 rests between the upper angled support members 10 to supply a place for the child user to sit or recline. To achieve this, the upper angled members 10 (and, correspondingly, the lower angled support members 8 and secondary vertical supports 11) may be separated by a plurality of rigid horizontal members, which would separate each pair of supports as a fixed distance distal to the axial line of the primary vertical support 1; the fixed distance would be a suitable width for a child patient to be comfortably placed between each pair of support members, for example reclining on the seat 14. Underneath the seat, a second fabric or flexible material member forms a storage basket 13. The basket 13 has a first end 109 and second end 110; the first end 109 is preferably affixed to the upper angled support members 10 at their second ends 104 as shown, and the second end 110 of the basket 13 is preferably affixed to the lower angled supports 8, as shown (the second ends 208B in the second exemplary embodiment of FIGS. 3-4). Above the child user's head and mounted to the upper angled members 10 is a semi-rigidly framed fabric covering that forms a sun shade 15. Extending from one of the upper angled support members 10 is a rigid or semi rigid ring support 16 to hold a bottle or cup. All of the above components are well known stroller features with which commercially available strollers are generally equipped. The invention generally pertains to the combination of stroller features with those of an IV pole, and therefore any available stroller feature that parents and caretakers may wish to have available is entirely appropriate to combine with the invention.

Figure 4:
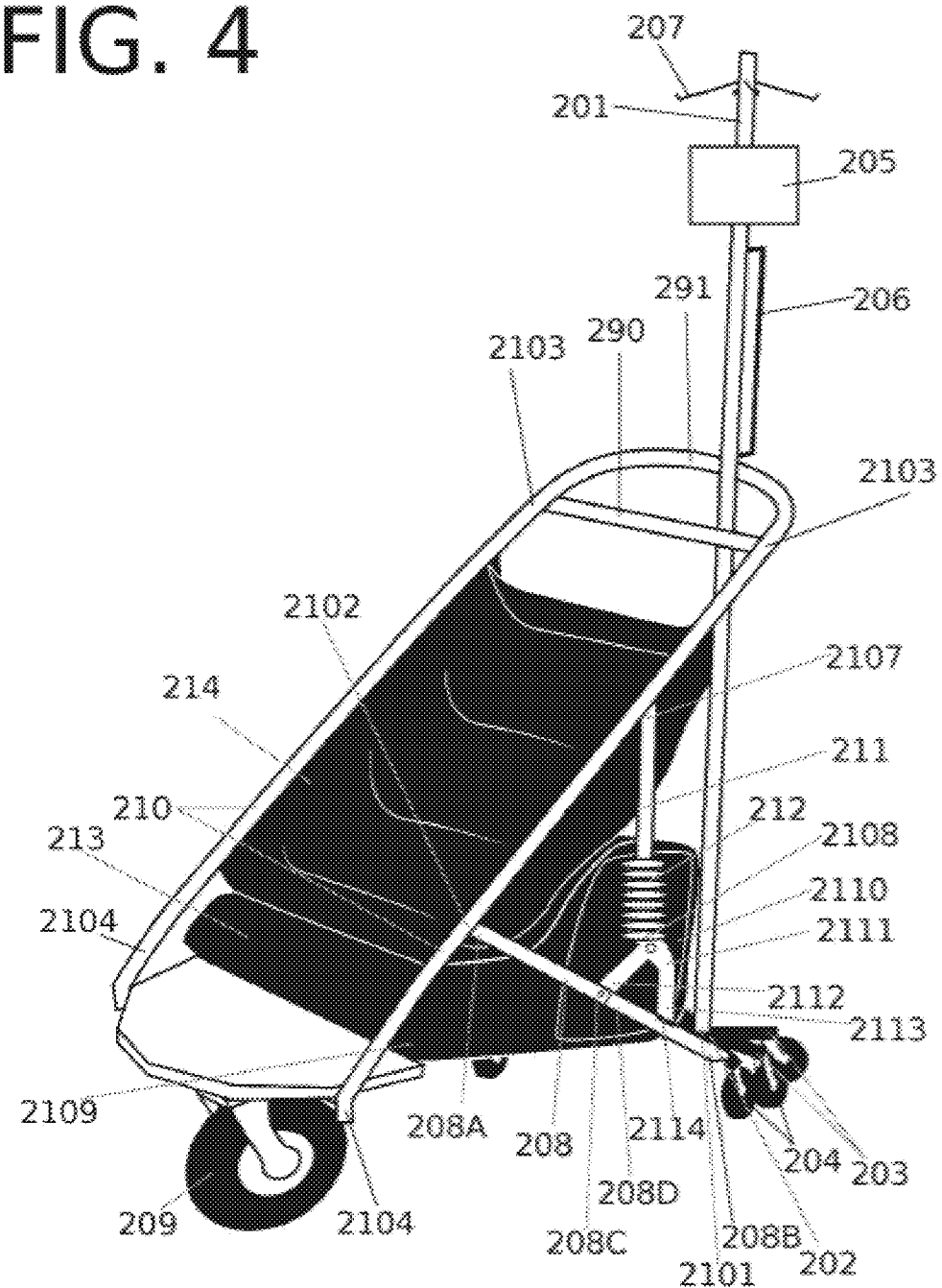
FIG. 4 shows side perspective view of the second exemplary embodiment, displaying the first vertical support member, the wheel base, radial members, the wheels, supports for medical devices, secondary vertical members, hooks, lower angled support members, front wheels, upper angled support members, secondary vertical supports, tension mechanism, storage basket, seat, the c-shaped members, and additionally identifying geometric positions.
Figure 5:
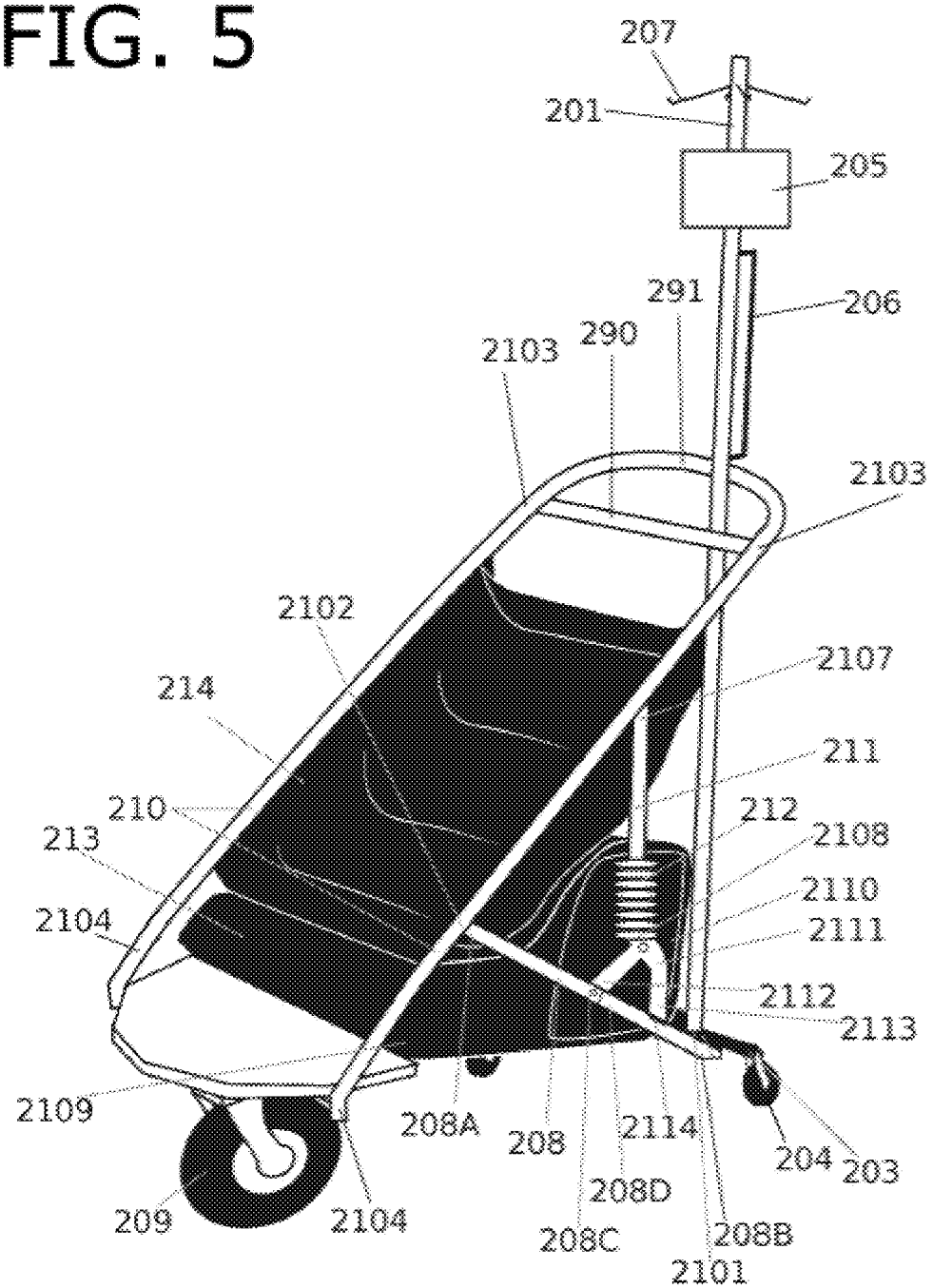
FIG. 5 shows a side perspective view of the second exemplary embodiment wherein, the plurality of integral radial members and fully or partially rotatable caster wheels are reduced to two in number, displaying the first vertical support member, the wheel base, radial members, the wheels, supports for medical devices, secondary vertical members, hooks, lower angled support members, front wheels, upper angled support members, secondary vertical supports, tension mechanism, storage basket, seat, the c-shaped members, and additionally identifying geometric positions.

FIGS. 2-4 show the second exemplary embodiment. In the second exemplary embodiment, the first vertical support member 201 has affixed near the upper end thereof the supports for medical devices 205, secondary vertical member 206, and hooks 207. The lower end 2101 of the first vertical support 201 is affixed to a wheel base 202. The wheel base 202 is structured with a plurality of radial members 203. Each radial member 203, and wheel base 202 may be of any size, number, or configuration needed to stably support the apparatus. The stroller seat 214 is suspended between a pair of upper angled support members 210. The upper angled support members may be separated by cross member 290 and/or a handlebar 291, as well as the foot rest shown. Affixed between the second ends 2104 of the upper angled support members 210 is one or more front wheels 209; the front wheel shown is of a swiveling caster type and may be mounted beneath a foot rest or cross member, as appropriate. The upper angled support members have defined their first ends 2103, second ends 2104, and a point distal to the axial center 2102. As shown, the vertical support 201 may pass between the first ends 2103 of the upper angled support members 210, for example in the space between the handlebar 291 and cross member 290, without being affixed to the upper angled supports 210.

A pair of lower angled support members 208 have defined a first end 208A, second end 208B, upper internal end 208C, and lower internal end 208D. The first end 208A is pivotably affixed to the upper angled supports 210 at the point distal to the center 2102. The second end 208B of the lower angled supports 208 is affixed pivotably, variously, to the wheel base 202, any of the radial members 203, or the lower end 2101 of the first vertical support member 201. Where the first vertical member is distal to the left-right (from the perspective of a riding or pushing user) center of the stroller, as shown in FIG. 22, appropriate structures may be present to link both of the pair of lower angled support members to at least a portion of the combination of the first vertical member 201, wheel base 202, or radial members 203. Centrally, the lower angled support members are divided into halves, with the upper internal ends 208C and lower internal ends 208 D defining a pivotable joint by which the lower angled support members 208 may be folded. The basket 213, which has a first end 2109 and a second 2110, is suspended between the lower angled support members 208 with the first end 2109 affixed to the upper angled support members 210 and the second end 2110 is affixed to the lower angled support members.

Each of a pair of secondary vertical supports 211 has a first end 2107 and a second end 2108. The first end 2107 is affixed pivotably to the corresponding one of the upper angled supports 210. The lower end 2108 terminates in a tension mechanism 212 that may extend and contract axially. The lower end 2108 is affixed pivotably to a c-shaped member 2111. The c-shaped member 2111 has a first end 2112 and a second end 2113. The first ends 2112 of the c-shaped members 2111 are pivotably affixed to the lower internal end 208C of the lower angled support members 208. The second ends 2113 of the c-shaped members 2111 terminate in padding 2114, which rests against each of the lower internal ends 208D of the lower angled support members 208.

The folding action of the second exemplary embodiment occurs by the lifting of the first ends 2103 of the upper angled support members 210. This causes the upper angled support members 210 to pivot counter-clockwise (from the view of FIG. 3) about its pivot with the lower angled support members 208 at the connection point 2102, distal to the axial center of the upper angled support members 210. This urges the secondary vertical supports 211 upward, which in turn pulls on the tension mechanism 212, allowing the secondary vertical supports to extend axially. The c-shaped member 2108 rotates counter-clockwise (from the view of FIG. 3) about its pivot at the lower internal end 208C of the lower angled support member 208. The second end 2113 of the c-shaped member 2111 lifts up and off the lower angled support 208. The lower angled support 208 pivots at the joint between the lower internal end 208C and the upper internal end 208D. The first ends 2103 of the upper angled support members 210 move up freely relative to the first vertical support 201. The overall result is that the entire apparatus collapses. The same action may be reversed to change from a collapsed state to an operational state.

In an alternative embodiment, the invention may take the form of a traditional stroller having a removable IV pole. In this alternative embodiment, the wheel base 2 is reduced in overall size and the radial members 3 are reduced to two in number or eliminated entirely. The casters 4 may be reduced to two in number and may be larger than would be customarily used with an IV pole, in accordance with a more-stroller-like appearance. In the alternative embodiment, the vertical member 1 may not be directly affixed to the wheel base 2 and may instead be removably affixed to one of the upper angled support members 10, or to a cross-member 290 or handlebar 291 affixed between the upper angled support members 10. The removable vertical member 1 may be secured in any type of receptacle or locking mechanism, many such mechanisms being well-known in the prior art.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A stroller and iv pole combination comprising:
  a) a first vertical support member;
  b) said first vertical support member having fixedly attached thereto a plurality of medical devices, medical fluid bags, or support structures for the same;
  c) said first vertical support member being fixedly mounted on top of a wheel base;
  d) said wheel base having a plurality of integral radial members and being mounted on top of a plurality of fully or partially rotatable caster wheels, such that each of said caster wheels supports one of said plurality of integral radial members;
  e) a pair of upper angled support members, each having a first end and a second end;
  f) said vertical support member being affixed rotatably at about its longitudinal center to said first end of at least one of said upper angled support members;
  g) a pair of lower angled support members, each having a first end and a second end, and being capable of flexing or pivoting centrally, with respect to both said first end and said second thereof;
  h) said first end of at least one of said lower angled support members being rotatably affixed to one of the group of said first vertical support member at or near its lower end or said wheel base;
  i) each of said second ends of said lower angled support members being rotatably affixed to the corresponding one of said upper angled support members at a position distal to the longitudinal center of said upper angled support member in the direction of its second end;
  j) a seat composed of a flexible fabric material;
  k) said seat being suspended between a plurality of opposing fixed attachment points on said upper angled support members; and
  l) said second ends of said upper angle support members being mounted to the top of a steerable front rotatable caster wheel.

2. The stroller and iv pole combination of claim 1 wherein a pair of second vertical supports, each having a first end and a second end, each of which is rotatably affixed at its first end to the corresponding upper angled support member; and a pair of tension members is provided, each of said tension members being rotatably affixed to the corresponding one of said lower angled support members at least one point and rotatable affixed to the second end of the corresponding second vertical support member.

3. The stroller and iv pole combination of claim 2 wherein a sun shade is provided and affixed to said upper angled support members at a position over said seat.

4. The stroller and iv pole combination of claim 2 wherein a storage basket is provided and affixed both to said upper angled support members and said lower angled support members.

5. The stroller and iv pole combination of claim 2 wherein a ring-shaped structure is rigidly affixed to either or both of said upper angled support members, whereby a cup or bottle may be accessibly stored while using the apparatus for transport.

6. The stroller and iv pole combination of claim 2 wherein a third vertical support member is rigidly affixed to said first vertical support member by a pair of short horizontal members such that said third vertical support member is located parallel and distal to said first vertical member.

7. The stroller and iv pole combination of claim 6 wherein a sun shade is provided and affixed to said upper angled support members at a position over said seat; wherein a storage basket is provided and affixed both to said upper angled support members and said lower angled support members; and wherein a ring-shaped structure is rigidly affixed to either or both of said upper angled support members, whereby a cup or bottle may be accessibly stored while using the apparatus for transport.

8. A stroller and iv pole combination comprising:
   a) a first vertical support member having a lower end;
   b) said first vertical support member having fixedly attached thereto any of the group of medical devices, medical fluid bags, or support structures for the same;
   c) a wheel base;
   d) said wheel base having a plurality of integral radial members and being mounted on top of a plurality of fully or partially rotatable caster wheels, such that each of said caster wheels supports one of said plurality of integral radial members;
   e) a pair of upper angled support members, each having a first end, a second end, and a position distal to a longitudinal center of said upper angled support members;
   f) a pair of lower angled support members, each having a first end, a second end, an upper internal end, and a lower internal end;
   g) each of said pair of lower angled support members having a pivotable joint at the junction between said upper internal end and said lower internal end;
   h) said first end of at least one of said lower angled support members being rotatably affixed to one of the group of said first vertical support member at or near its lower end, said wheel base, or said plurality of integral radial members;
   i) each of said second ends of said lower angled support members being rotatably affixed to the corresponding said position distal to the longitudinal center of one of said upper angled support members;
   j) a seat composed of a flexible fabric material;
   k) said seat being suspended between a plurality of opposing fixed attachment points on said upper angled support members; and
   l) one or more front wheels, said one or more front wheels being mounted between said second ends of said upper angled support members.

9. The stroller and iv pole combination of claim 8 wherein a pair of second vertical supports, each having a first end and a second end, each of which is rotatably affixed at its first end to the corresponding upper angled support; each of said pair of second vertical supports terminating in a tension member at its second end; said second end of said second vertical member being pivotably affixed to a c-shaped member; said c-shaped member having a first end and a second end; said first end of said c-shaped member being pivotably affixed to said lower angled support at said upper internal end thereof; said second end of said c-shaped member resting against said lower internal end of said lower angled support.

10. The stroller and iv pole combination of claim 9 wherein a storage basket having a first end and a second end is provided; said first end of said storage basket being affixed to said upper angled support members; and said second end of said storage basket being affixed to said lower angled support members.

11. The stroller and iv pole combination of claim 9 further comprising at least one of the group of a cross member or a handle bar; said at least one of the group of a cross member or a handle bar being affixed between said first ends of said pair of upper angled support members.

12. The stroller and iv pole combination of claim 11 wherein a storage basket having a first end and a second end is provided; said first end of said storage basket being affixed to said upper angled support members; and said second end of said storage basket being affixed to said lower angled support members.

13. The stroller and iv pole combination of claim 11 wherein said plurality of integral radial members is equal to two in number; said plurality of said fully or partially rotatable caster wheels is equal to two in number; said lower angled support members are affixed at said second ends thereof to said wheelbase; and said first vertical support member is affixed to said at least one of the group of a cross member or a handle bar.

14. The stroller and iv pole combination of claim 13 wherein a storage basket having a first end and a second end is provided; said first end of said storage basket being affixed to said upper angled support members; and said second end of said storage basket being affixed to said lower angled support members.

15. The stroller and iv pole combination of claim 8 further comprising at least one of the group of a cross member or a handle bar; said at least one of the group of a cross member or a handle bar being affixed between said first ends of said pair of upper angled support members.

16. The stroller and iv pole combination of claim 15 wherein said plurality of integral radial members is equal to two in number; said plurality of said fully or partially rotatable caster wheels is equal to two in number; said lower angled support members are affixed at said second ends thereof to said wheelbase; and said first vertical support member is affixed to said at least one of the group of a cross member or a handle bar.

17. The stroller and iv pole combination of claim 15 wherein a storage basket having a first end and a second end is provided; said first end of said storage basket being affixed to said upper angled support members; and said second end of said storage basket being affixed to said lower angled support members.

18. The stroller and iv pole combination of claim 12 wherein a storage basket having a first end and a second end is provided; said first end of said storage basket being affixed to said upper angled support members; and said second end of said storage basket being affixed to said lower angled support members.

* * * * *